(12) United States Patent
Matsunaga et al.

(10) Patent No.: US 11,878,853 B2
(45) Date of Patent: Jan. 23, 2024

(54) PACKAGING BAG, METHOD FOR MANUFACTURING PACKAGING BAG, AND PRESSING MEMBER

(71) Applicant: TOYO SEIKAN CO., LTD., Tokyo (JP)

(72) Inventors: Shie Matsunaga, Yokohama (JP); Hayato Asai, Yokohama (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 172 days.

(21) Appl. No.: 17/281,387

(22) PCT Filed: Sep. 26, 2019

(86) PCT No.: PCT/JP2019/037899
§ 371 (c)(1),
(2) Date: Mar. 30, 2021

(87) PCT Pub. No.: WO2020/071240
PCT Pub. Date: Apr. 9, 2020

(65) Prior Publication Data
US 2022/0315307 A1 Oct. 6, 2022

(30) Foreign Application Priority Data
Oct. 1, 2018 (JP) ................. 2018-186691

(51) Int. Cl.
*B65D 75/58* (2006.01)
*B31B 70/64* (2017.01)
(Continued)

(52) U.S. Cl.
CPC ........ *B65D 75/5805* (2013.01); *B31B 70/642* (2017.08); *B65B 51/10* (2013.01); *B65D 33/00* (2013.01)

(58) Field of Classification Search
CPC .. B65D 75/5805; B65D 33/00; B31B 70/642; B65B 51/10
(Continued)

(56) References Cited

U.S. PATENT DOCUMENTS 2,620,944 A * 12/1952 Stahl ................. B65D 75/5822
383/905
6,667,081 B1 * 12/2003 Aoki ................. B65D 75/5822
383/207

(Continued)

FOREIGN PATENT DOCUMENTS

CN 202054303 U 11/2011
EP 1 055 612 A1 11/2000

(Continued)

OTHER PUBLICATIONS

Office Action dated Dec. 5, 2022, in corresponding Chinese Application No. 201980062897.1.

(Continued)

*Primary Examiner* — Peter N Helvey
(74) *Attorney, Agent, or Firm* — Sughrue Mion, PLLC

(57) ABSTRACT

A packaging bag unsealed from a first side to a second side opposed to the first side, including: an inclination seal part (5) at a corner provided consecutively to the second side, wherein the inclination seal part (5) has a strong-pressure seal zone (7) along an inner edge (50) of the inclination seal part (5), the strong-pressure seal zone (7) being pressed by a higher pressing force than other parts of the inclination seal part (5), and being smaller in thickness than other parts of the inclination seal part (5). Also disclosed is a pressing member and a method for manufacturing the packaging bag.

2 Claims, 8 Drawing Sheets

(51) Int. Cl.
B65B 51/10 (2006.01)
B65D 33/00 (2006.01)

(58) Field of Classification Search
USPC ........................................................ 383/200
See application file for complete search history.

(56) References Cited

U.S. PATENT DOCUMENTS

| | | | | |
|---|---|---|---|---|
| 11,066,221 | B2 * | 7/2021 | Perell | B65D 75/5855 |
| 2012/0279956 | A1 * | 11/2012 | Bohrer | B65D 75/5805 |
| | | | | 219/730 |
| 2018/0118440 | A1 | 5/2018 | Asai et al. | |

FOREIGN PATENT DOCUMENTS

| | | |
|---|---|---|
| JP | 61-244703 A | 10/1986 |
| JP | 2014-198576 A | 10/2014 |
| JP | 2016-16612 A | 2/2016 |
| JP | 2016-203990 A | 12/2016 |
| JP | 2017-226444 A | 12/2017 |
| JP | 2018-2251 A | 1/2018 |
| WO | 2016/166968 A1 | 10/2016 |

OTHER PUBLICATIONS

First Office Action dated May 10, 2022, issued in corresponding Chinese Application No. 201980062897.1.
International Search Report dated Dec. 17, 2019 from the International Searching Authority in International Application No. PCT/JP2019/037899.
International Preliminary Report on Patentability with the translation of Written Opinion dated Apr. 15, 2021 from the International Bureau in International Application No. PCT/JP2019/037899.
Japanese Office Action dated Feb. 7, 2023 in Japanese Application No. 2018-186691.

* cited by examiner

PACKAGING BAG, METHOD FOR MANUFACTURING PACKAGING BAG, AND PRESSING MEMBER

CROSS REFERENCE TO RELATED APPLICATIONS

This application is a National Stage of International Application No. PCT/JP2019/037899 filed Sep. 26, 2019, claiming priority based on Japanese Patent Application No. 2018-186691 filed Oct. 1, 2018.

TECHNICAL FIELD

The present invention relates to a packaging bag, a method for manufacturing a packaging bag and a pressing member. In more in detail, the present invention relates to a packaging bag with an inclination seal part at a corner, a method for manufacturing the packaging bag, and a pressing member used for manufacturing the packaging bag.

BACKGROUND ART

Recently, packaging bags containing contents, such as retort pouches, have been widely used. Many of these packaging bags are unsealed by tearing a part near an upper seal part from one side seal part to the other side seal part by fingers. Therefore, an easily openable part such as a notch and a cut part is formed at the side seal part of many packaging bags.

At the time of unsealing a packaging bag containing viscous contents such as retort curry, it is desirable not only to tear the packaging bag from one end to the other, but to separate a broken piece torn from the packaging bag. If the broken piece is not separated and remains, the contents adhering to the broken piece also would adhere to the hands at the time of taking out the contents. Further, when a person tries to forcibly tear off the unseparated broken piece, sometimes the contents adhering to the broken piece would scatter around accidentally.

FIGS. 6 and 7 show a state of unsealing a conventional packaging bag. The packaging bag in a conventional art is a flat pouch configured in such a manner that a front film 101a and a back film 101b are laminated on each other and four sides are heat-sealed by left and right side seal parts 102,104, a top seal part 106 and a bottom seal part 108. In the examples shown in FIGS. 6 and 7, the packaging bag is unsealed from a notch 110 of the side seal part 102 on the left side to the side seal part 104 on the right side. As a broken piece 100 moves toward the right side, break lines 110a and 110b due to tearing the front film 101a and the back film 101b are formed toward the side seal part 104 on the right side.

In a storage part between the left and right side seal parts 102 and 104, as shown in FIG. 7(a), the break line 110a of the front film 101a and the break line 110b of the back film 101b vertically deviate from each other in many cases. As a result, the break lines 110a and 110b often reach mutually different positions in an inner edge 104a of the side seal part 104 on the right side.

Further, FIG. 7(b) shows an enlarged view of a part surrounded by a broken line C in FIG. 7(a). In the inner edge 104a of the side seal part 104, an arrival point Pa of the break line 110a of the front film 101a and an arrival point Pb of the break line 110b of the back film 101b are spaced by an interval W. In order to further tear the side seal part 104 from the arrival points Pa and Pb, a fused part of the side seal part 104 needs to be torn away with a width of this interval W. However, great force is required for breaking the side seal part 104 while tearing it, and therefore it is often difficult to separate the broken piece 100.

Then, one example of a packaging bag where the broken piece can be easily separated is described in Patent Literature 1. Patent Literature 1 discloses a packaging bag where an unsealing termination end side seal part has an inclined inner edge. When this packaging bag is unsealed, a break line of a front film and a break line of a back film merge in the inclined inner edge and proceed in a region of the unsealing termination end side seal part. As a result, the unsealing termination end side seal part can be torn with a small shearing force and therefore the broken piece of the packaging bag can be easily separated.

RELATED ART DOCUMENTS

Patent Documents

Patent Document 1: JP 2016-203990 A

SUMMARY OF THE INVENTION

Subject to be Solved by the Invention

By the way, a front film and a back film of a packaging bag such as a retort pouch are each composed of multiaxially stretched laminated films, and the break lines tend to easily proceed along orientation directions of the films. Due to this, the following states have occurred: when an orientation angle of a film having an axial line of an unsealing direction defined as 0 degree is small, the broken piece can be easily separated and, when the orientation angle is large, the break line of the front film or the back film does not proceed along the straight inner edge 105 of the inclination seal part shown in FIG. 8 nor along the curved inclined inner edge 107 indicated by a broken line in the same drawing, thereby making it difficult to easily separate the broken piece of the packaging bag.

The present invention is realized with the above circumstances taken into consideration and its object is to provide a packaging bag which allows the broken piece to be separated more certainly at the time of unsealing the packaging bag, a method for manufacturing the packaging bag and a pressing member.

Means for Solving the Problems

The packaging bag according to the present invention is a packaging bag unsealed from a first side to a second side opposed to the first side, comprising:
 an inclination seal part at a corner provided consecutively to the second side, wherein
 the inclination seal part has a strong-pressure seal zone along an inner edge of the inclination seal part, the strong-pressure seal zone being pressed by a higher pressing force than other parts of the inclination seal part, and being smaller in thickness than other parts of the inclination seal part.

Further, the pressing member according to the present invention is a pressing member having a pressing surface for pressing the strong-pressure seal zone for forming the strong-pressure seal zone of the packaging bag according to claim 1, wherein
the pressing surface includes
a flat part for pressing a part adjacent to an inner edge of the strong-pressure seal zone, and
an inclination part that is provided consecutively to the flat part and recedes from the flat part as the distance from the flat part increases.

Further, the method for manufacturing the packaging bag according to the present invention is a method for manufacturing a packaging bag unsealed from a first side to a second side opposed to the first side, comprising:
a corner sealing step of heat-sealing a corner provided consecutively to the second side to form an inclination seal part at the corner; and
a strong-pressure sealing step of pressing a part along an inner edge of the inclination seal part by applying a higher pressure than other parts of the inclination seal part by a pressing member to form a strong-pressure seal zone being smaller in thickness than other parts of the inclination seal part.

Advantageous Effects of the Invention

According to the present invention, the strong-pressure seal zone is formed along the inner edge of the inclination seal part. Due to this, when the packaging bag is unsealed, the break lines are more certainly guided along the inner edge of the strong-pressure seal zone, so that the break line of the front film and the break line of the back film merge in the inner edge of the strong-pressure seal zone. As a result, when the packaging bag is unsealed, the broken piece can be separated more certainly.

BRIEF DESCRIPTION OF THE DRAWINGS

FIG. 4 is a schematic view showing sectional shapes of a seal bar according to the present invention.

MODE FOR CARRYING OUT THE INVENTION (Packaging Bag)
In the following, embodiments of the packaging bag according to the present invention will be described with reference to the drawings.

Figure 1:
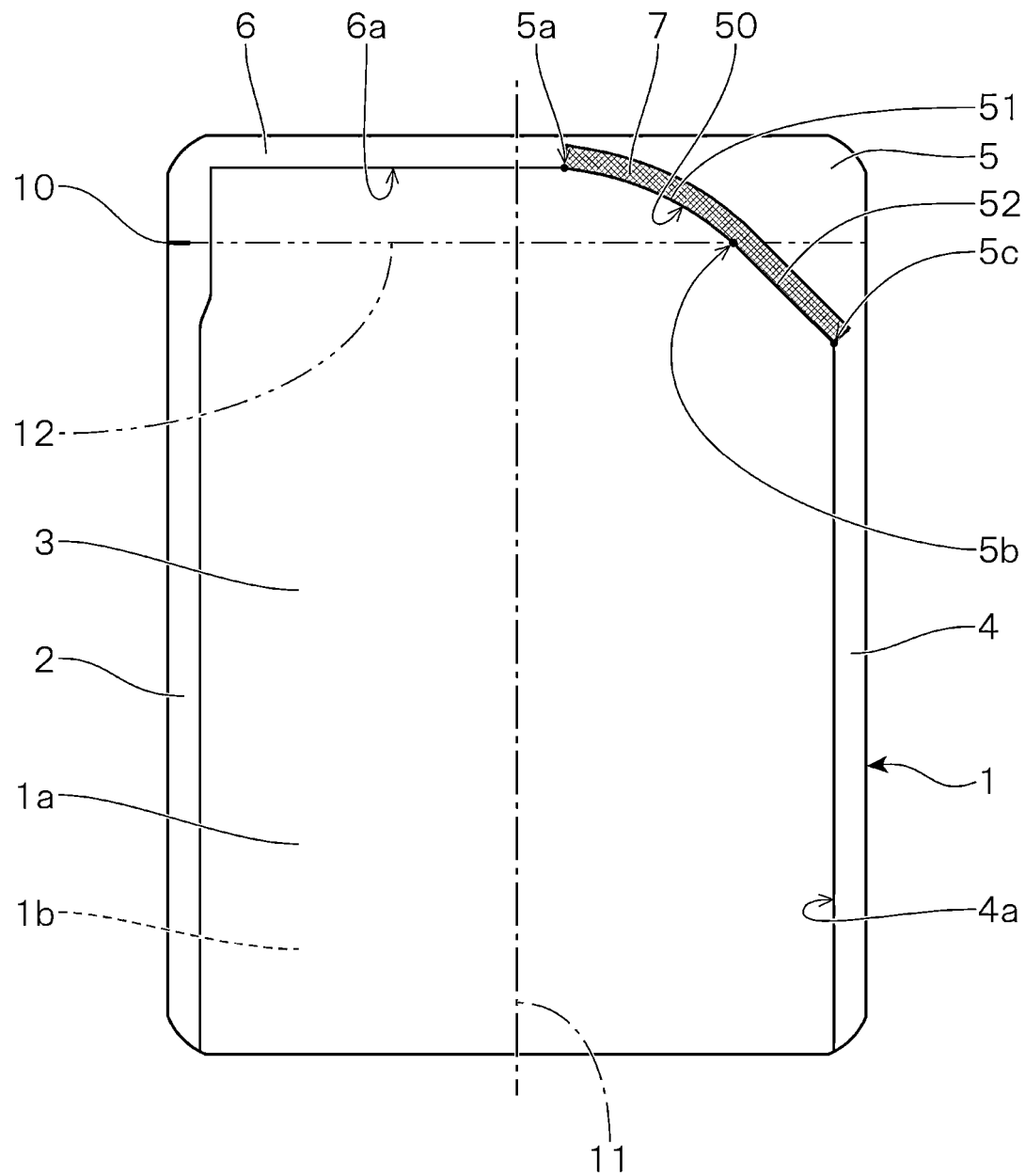
FIG. 1 is a front view showing a packaging bag according to an embodiment of the present invention.

FIG. 1 is a front view showing a packaging bag 1 according to the first embodiment of the present invention. This packaging bag 1 is a flat pouch having a front film 1a and a back film 1b laminated with each other.

The front film 1a and the back film 1b are laminated films obtained by laminating, for example, a nylon layer on a polyolefin layer.

For the front film 1a and the back film 1b, various heat-weldable materials and configurations can be adopted. For example, the front film 1a and the back film 1b may be configured as a single layer film composed of a heat-weldable thermoplastic resin, and may also be configured as a laminated film having a welded surface as a sealant resin (heat sealable resin). The laminated film may have a lamination structure where a barrier layer such as an aluminum layer is provided as an intermediate layer, and may also have a lamination structure where the barrier layer is provided in the front layer. Further, as for the laminated film, a resin layer may be the base material or paper may be the base material.

In the packaging bag 1, a heat-sealed unsealing starting end side seal part 2 is formed as a first side, a heat-sealed unsealing terminating end side seal part 4 is formed as a second side opposed to the first side, and further a top seal part 6 is formed on an upper end edge with an unsealing opening forming side facing upward.

Into a storage part 3 enclosed by these seal parts 2, 4 and 6, for example, contents are filled from a bottom part and, after the filling, the bottom part (lower end edge) is heat-welded to form a bottom seal part, so that the contents are sealed and packaged.

At a corner provided consecutively to the unsealing terminating end side seal part 4, an inclination seal part 5 is formed. An inner edge 50 of the inclination seal part 5 diagonally crosses an unsealing virtual straight line 12 extending in an unsealing direction from an easily openable part 10 formed in the unsealing starting end side seal part 2.

The unsealing virtual straight line 12 is a straight line along an unsealing direction in which a part being a broken piece above the easily openable part 10 is pulled by the fingers at the time of unsealing the packaging bag toward the unsealing terminating end side seal part 4 from the easily openable part 10 formed as a notch in the unsealing starting end side seal part 2. As in the present embodiment, if an outer edge of the packaging bag has a substantially rectangular shape, as shown in FIG. 1, the unsealing virtual straight line 12 is orthogonal to a symmetric axial line 11 and extends parallel to a straight lower edge 6a of the top seal part 6.

The inner edge 50 of the inclination seal part 5 includes a curve section 51 curved in a convex shape toward the outer edge of the packaging bag 1, and a straight section 52 provided consecutively to the end 5b on the unsealing terminating end side of the curve section 51. The curve section 51 has, for example, an arc shape. Further, the straight section 52 is extended in a tangential direction at the end 5b of the curve section 51.

The inner edge 50 of the inclination seal part 5 includes the curve section 51 curved in a convex shape toward the outer edge of the packaging bag 1, thereby suppressing reduction of the volume of the packaging bag caused by providing the inclination seal part 5 in the unsealing terminating end side seal part 4.

The inclination seal part 5 then includes a strong-pressure seal zone (a strong-pressure seal band) 7 along the inner edge 50 of the inclination seal part 5. The strong-pressure zone 7 is heat-sealed by applying a higher pressing force than other parts of the inclination seal part 5. For this reason, as described later, the strong-pressure seal zone 7 is smaller in thickness than the parts other than the strong-pressure seal zone 7 of the inclination seal part 5 (see FIGS. 3(*b*) to 3(*d*)).

Next, referring to FIG. 2, the guidance of the break lines by the inner edge 50 of the inclination seal part 5 at the time of unsealing the packaging bag 1 will be explained.

When the packaging bag 1 is unsealed, the unsealing starts from the unsealing starting end side seal part 2 where the easily openable part 10 is formed, to the unsealing terminating end side seal part 4 through the storage part 3.

Concretely, first, a part above the easily openable part 10 is pulled by the fingers toward the unsealing terminating end side seal part 4, thereby breaking the unsealing starting end side seal part 2 from the easily openable part 10. Then, the part above the easily openable part 10 becomes a broken piece.

Further, when the broken piece is pulled rightward in the drawing, each of the front film 1*a* and the back film 1*b* is split in the storage part 3, so that the break line (front break line) 10*a* of the front film 1*a* and the break line (back break line) 10*b* of the back film 1*b* start to extend toward the unsealing terminating end side seal part 4. At this time, as shown in FIG. 2, the front break line 10*a* and the back break line 10*b* vertically deviate from each other, namely, the front and back deviation occurs in many cases.

Figure 2:
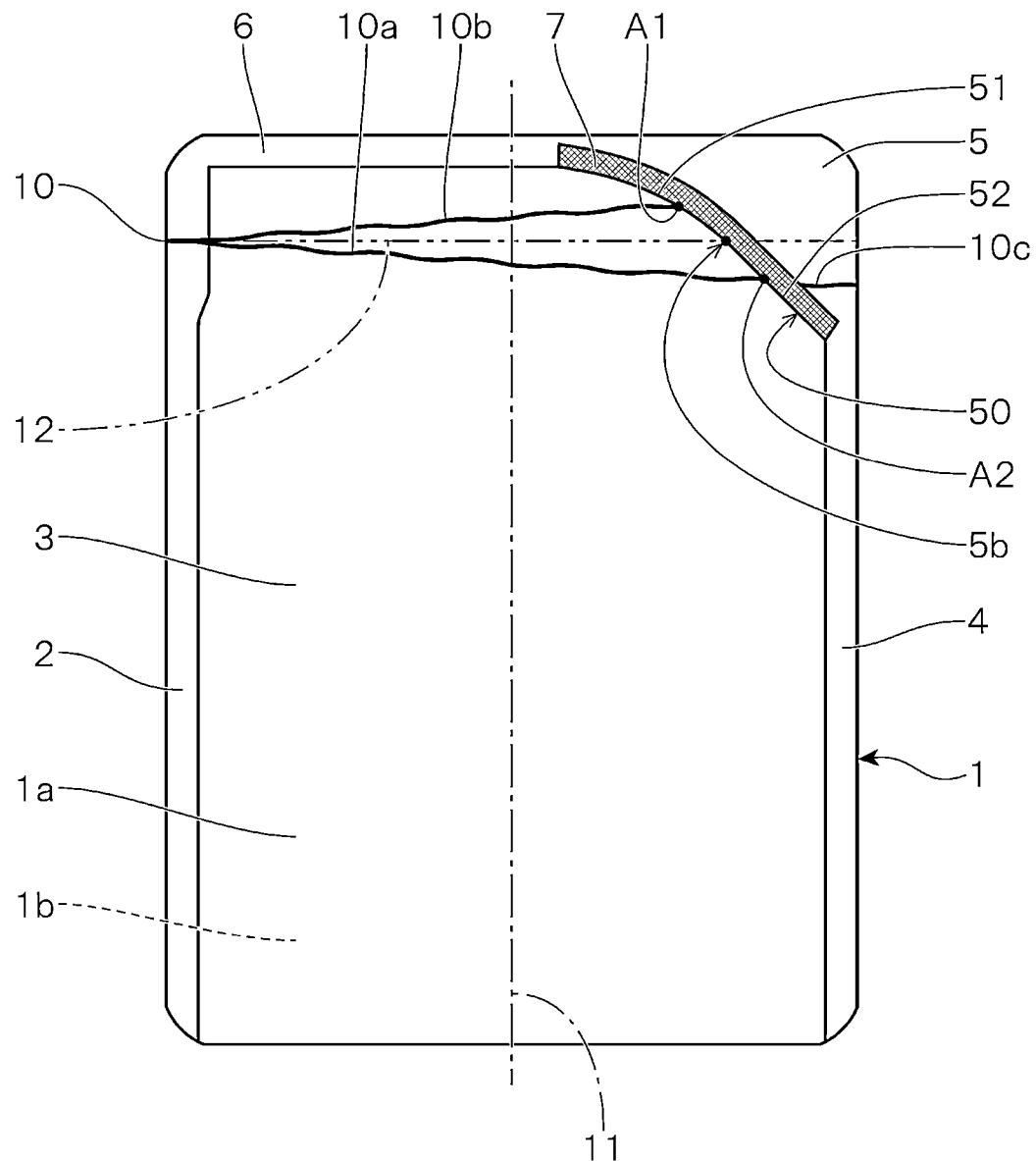
FIG. 2 explains the guidance of a break line at the time of unsealing a packaging bag according to an embodiment of the present invention.

In an example shown in FIG. 2, the back break line 10*b* first reaches a point A1 in the curve section 51 of the inner edge 50 of the inclination seal part 5. The back break line 10*b* having reached the point A1 proceeds while being guided along the strong-pressure seal zone 7 formed in the inner edge 50 of the inclination seal part 5.

The strong-pressure zone 7 is heat-sealed by applying a higher pressing force than other parts of the inclination seal part 5, and therefore sealed more strongly than other parts of the inclination seal part 5. Therefore, it is more difficult for the break line to proceed into the strong-pressure seal zone 7 than into other parts of the inclination seal part 5. Due to this, when the packaging bag is unsealed, the break lines are more certainly guided along the inner edge of the strong-pressure seal zone.

Next, the back break line 10*b* having proceeded along the inner edge 50 of the inclination seal part 5 merges with the front break line 10*a* at a point A2 in the inner edge 50 of the inclination seal part 5. As a result, a break line 10*c* proceeds in the terminating end side seal part 4 from the point A2, so that the broken piece is separated.

(Manufacturing Method)

Next, embodiments of the method for manufacturing the packaging bag 1, and the seal bar as the pressing member used for manufacturing the packaging bag 1 will be explained.

The packaging bag 1 according to the present embodiment comprises not only a conventional manufacturing step including a top sealing step for forming a top seal part 6 and a side sealing step for forming the unsealing starting end side seal part 2 and the unsealing terminating end side seal part 4, but also a corner sealing step of forming the inclination seal part 5 at the corner of the packaging bag 1 and a strong-pressure sealing step of heat-sealing the part along the inner edge of the inclination seal part 5 by applying a higher pressure than other parts of the inclination seal part 5 by the pressing member to form the strong-pressure seal zone 7, the strong-pressure seal zone 7 being smaller in thickness than other parts of the inclination seal part.

The respective sealing steps may be separately performed or may also be combined and performed at the same time.

FIG. 3 is a sectional view showing the sectional shapes of the seal bars as the pressing member and the cross-sections of the seal parts. The respective drawings in FIG. 3 schematically show cross-sections being orthogonal to the tangential lines of the inner edge 50 of the inclination seal part 5, namely, sectional shapes of the seal bars in the cross-sections being orthogonal to an extending direction of the strong-pressure seal zone 7.

First, FIG. 3(*a*) shows a sectional shape of a seal bar 90 for forming the inclination seal part 5 and a sectional view of the inclination seal part 5 in the corner sealing step.

As shown in the same drawing, the seal bar 90 has a wide and flat pressing surface 90*a* and the thickness of the sealed inclination seal part 5 is approximately identical to the thickness of the storage part 3.

Next, FIG. 3(*b*) shows a sectional shape of a seal bar 91 for forming the strong-pressure seal zone 7 and a sectional view of the inclination seal part 5 where the strong-pressure seal zone 7 is formed in the strong-pressure sealing step.

As shown in the same drawing, the width of the pressing surface of the seal bar 91 for forming the strong-pressure seal zone 7 is narrower than the width of the pressing surface of the seal bar 90 for forming the inclination seal part 5. Namely, the area of the pressing surface of the seal bar 91 is narrower. Therefore, the strong-pressure zone 7 is sealed by applying a higher pressing force by the seal bar 91 than other parts of the inclination seal part 5.

As a result, as shown in FIG. 3(*b*), the thickness of the strong-pressure seal zone 7 is smaller than the thicknesses in parts other than the strong-pressure seal zone 7 of the inclination seal part 5. Further, a sealant resin pushed out from the strong-pressure seal zone 7 by the heat sealing contiguously accumulates along the inner edge 50 and the outer edge 7*b* of the strong-pressure seal zone 7, resulting in formation of an inner edge side protruding strip part 80 and an outer edge side protruding strip part 81.

The strong-pressure seal zone 7 is sealed by the seal bar 91 more strongly than other parts of the inclination seal part 5 and therefore, when the packaging bag 1 is unsealed, the break lines are guided more certainly along the inner edge 50 of the strong-pressure seal zone 7.

As shown in FIGS. 4(*a*) to 4(*c*), a width W in the sectional shape of the flat pressing surface of the seal bar forming the strong-pressure seal zone 7 can be experimentally set to a suitable value. For example, the width of 0.6 mm to 10.0 mm is preferable and, more preferably, the width is 1.0 mm to 5.0 mm.

When the width W of the flat part of the pressing surface is 0.6 mm, the strong-pressure seal zone can be formed. However, as the width W of the flat part of the pressing surface is too narrow, this width is not preferable from the viewpoint of the strength of the seal bar.

Further, when the width W of the flat part of the pressing surface is larger than 10.0 mm, it is difficult for the thickness of the strong-pressure seal zone 7 to become small and it is difficult to achieve sufficient pressing. Accordingly, improvement would be required to increase the pressing force of a device.

By the way, the outer edge side protruding strip part 81 along the outer edge 7*b* of the strong-pressure seal zone 7 is conspicuous as a level difference part in the inclination seal part 5 and therefore it is not preferable for the appearance of the packaging bag 1.

For this reason, the level difference is preferably restrained along the outer edge 7*b* of the strong-pressure seal zone 7.

Figure 3B:
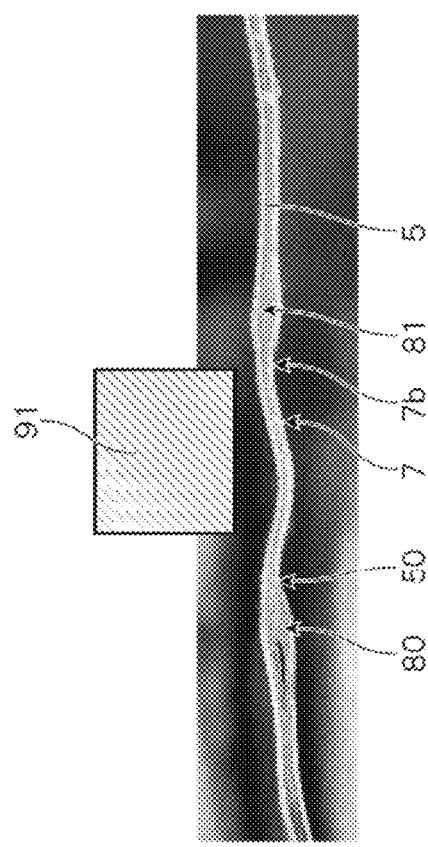
FIGS. 3(a) to 3(d) showing sectional schematic shapes of seal bars and sectional views of a seal part.
Figure 3D:
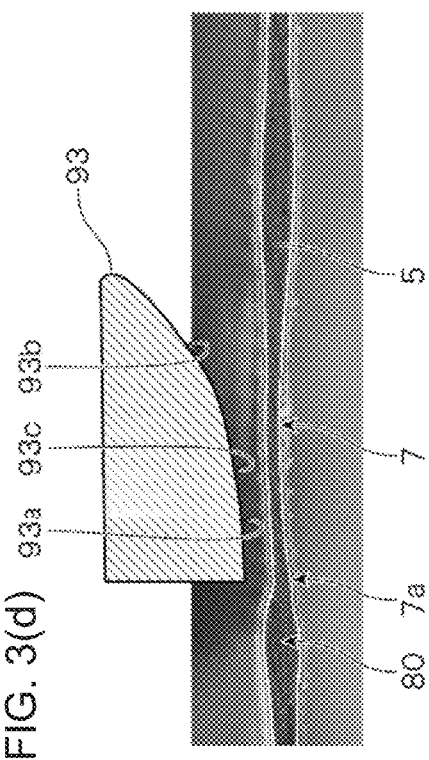
Figure 3A:
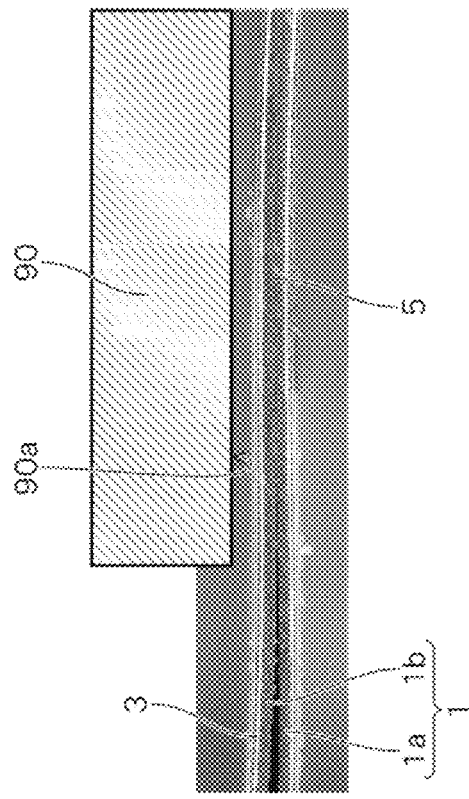
Figure 3C:
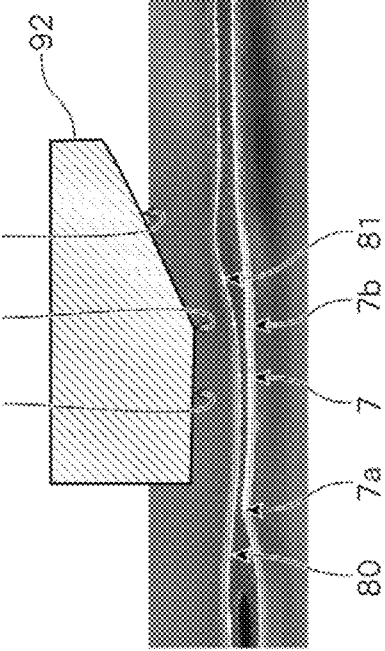

Then, FIG. 3(c) shows the sectional shape of the seal bar 92 improved for forming the strong-pressure seal zone 7 in the strong-pressure sealing step and the sectional view of the inclination seal part 5 where the strong-pressure seal zone 7 is formed.

The seal bar 92 shown in the drawing is a pressing member with a pressing surface for pressing the strong-pressure seal zone 7, wherein the pressing surface includes a flat part 92a for pressing a part adjacent to the inner edge 50 of the strong-pressure seal zone 7 and an inclination part 92b that is provided consecutively to the flat part 92a and recedes from the flat part 92a as the distance from the flat part 92a increases.

The inclination part 92b of the seal bar 92 in the same drawing has a flat pressing surface.

When the packaging bag 1 is pressed by the seal bar 92, first, the packaging bag 1 is pressed by only the flat part 92a of the pressing surface. Next, as the seal bar 92 sinks into the packaging bag 1, the inclination part 92b gradually contacts with the packaging bag 1 from the side of the flat part 92a. As a result, the sealant pushed out to the outer edge side from the strong-pressure seal zone 7 is further gradually pushed outward as the inclination part 92b sinks. In this manner, the level difference along the outer edge of the strong-pressure seal zone 7 is restrained, so that the appearance can be improved.

By the way, as shown in FIG. 3(c), a boundary line 92c between the flat part 92a of the pressing surface and the inclination part 92b of the seal bar 92 is squarish. Due to this, during the strong-pressure sealing step, it is likely that the front layer of the front film is damaged by the boundary line 92c along the outer edge 7b of the strong-pressure seal zone 7.

Figure 5:
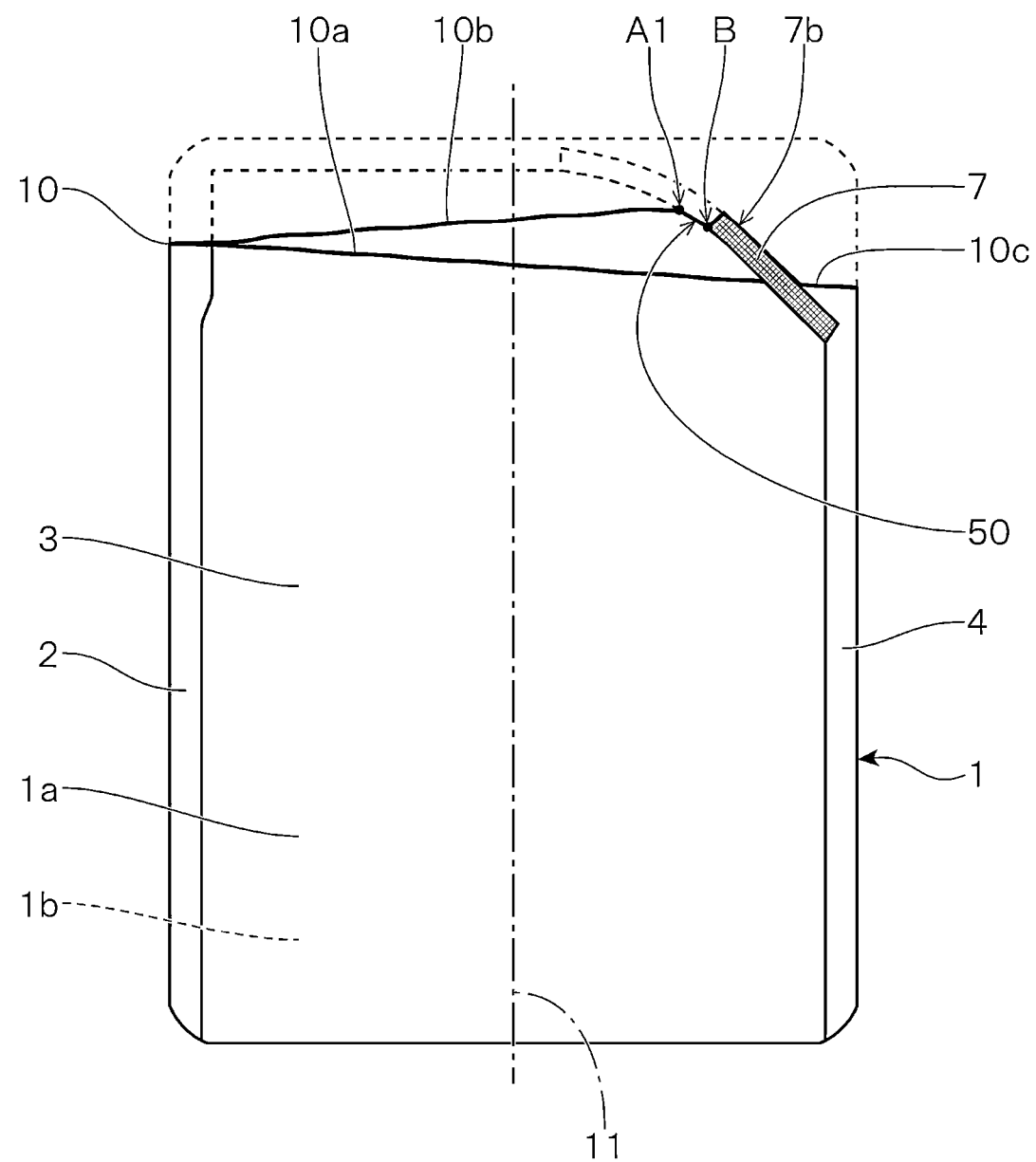
FIG. 5 is a front view for explaining an irregularly unsealed state of a packaging bag according to the second embodiment of the present invention.
Figure 6:
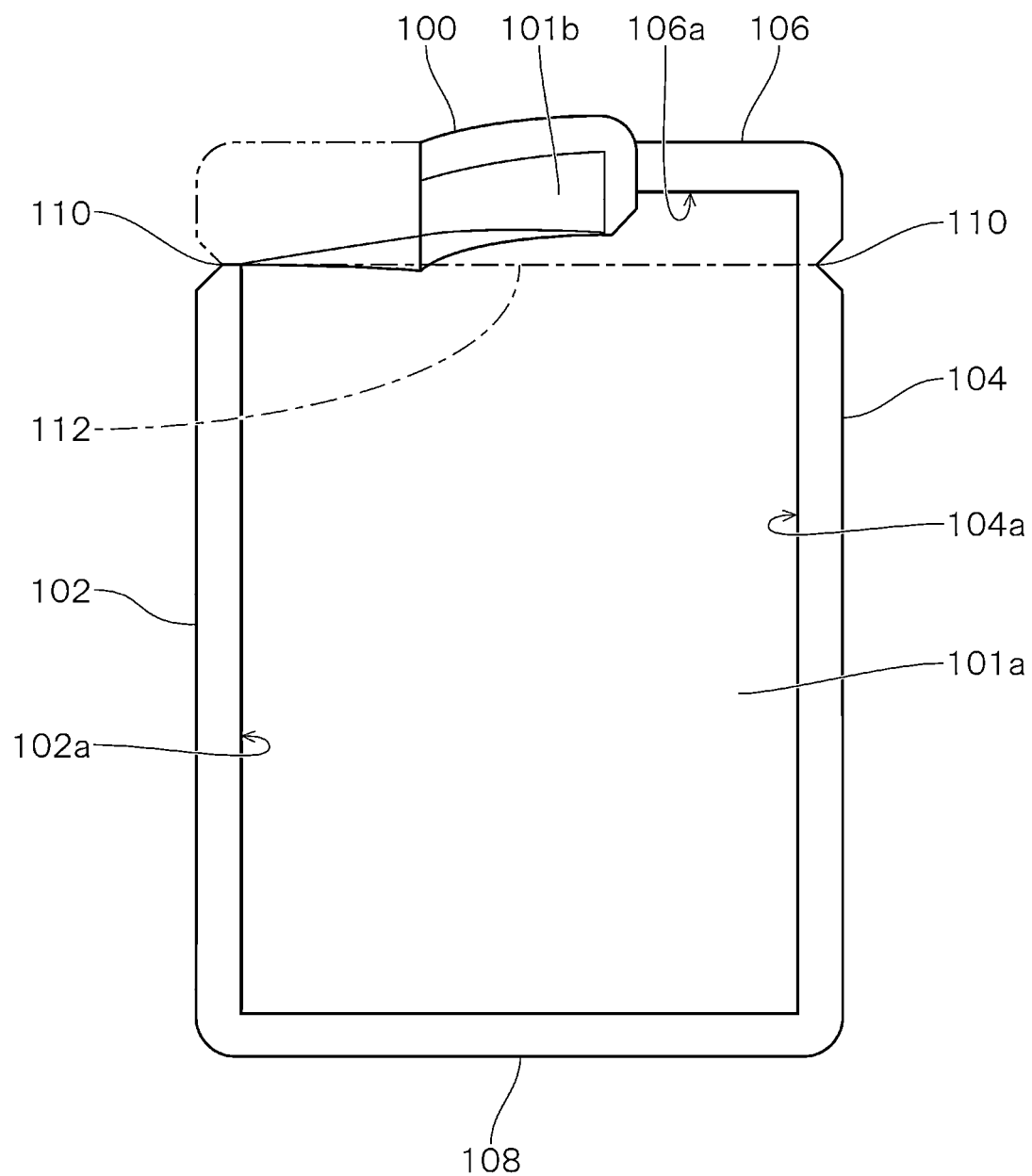
FIG. 6 is a front view showing an unsealed state of a packaging bag according to a conventional example.
Figure 7A:
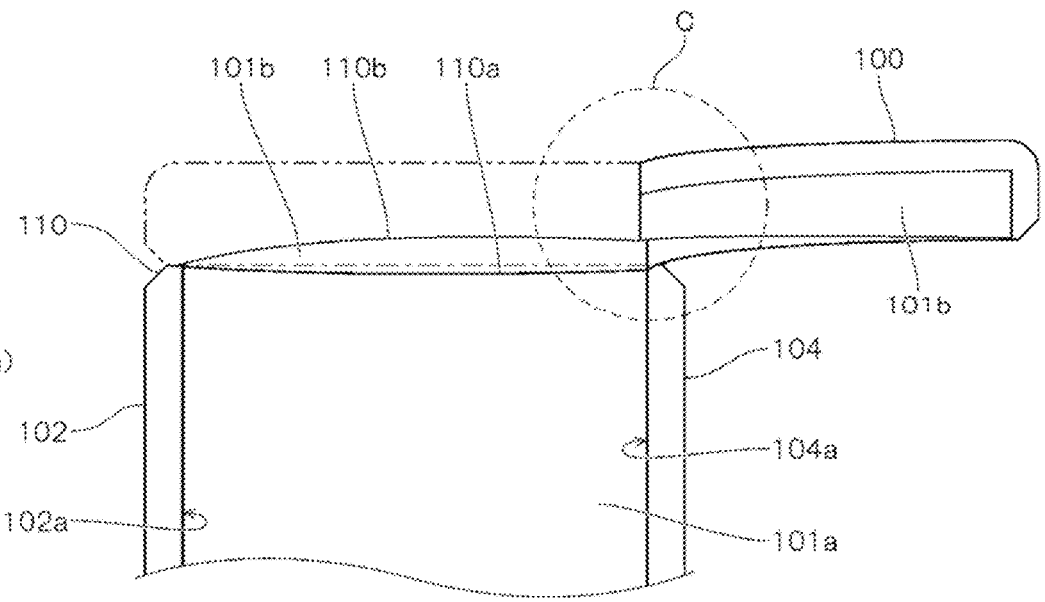
FIG. 7(A) is a front view showing the unsealed state of a packaging bag according to a conventional example.
Figure 7B:
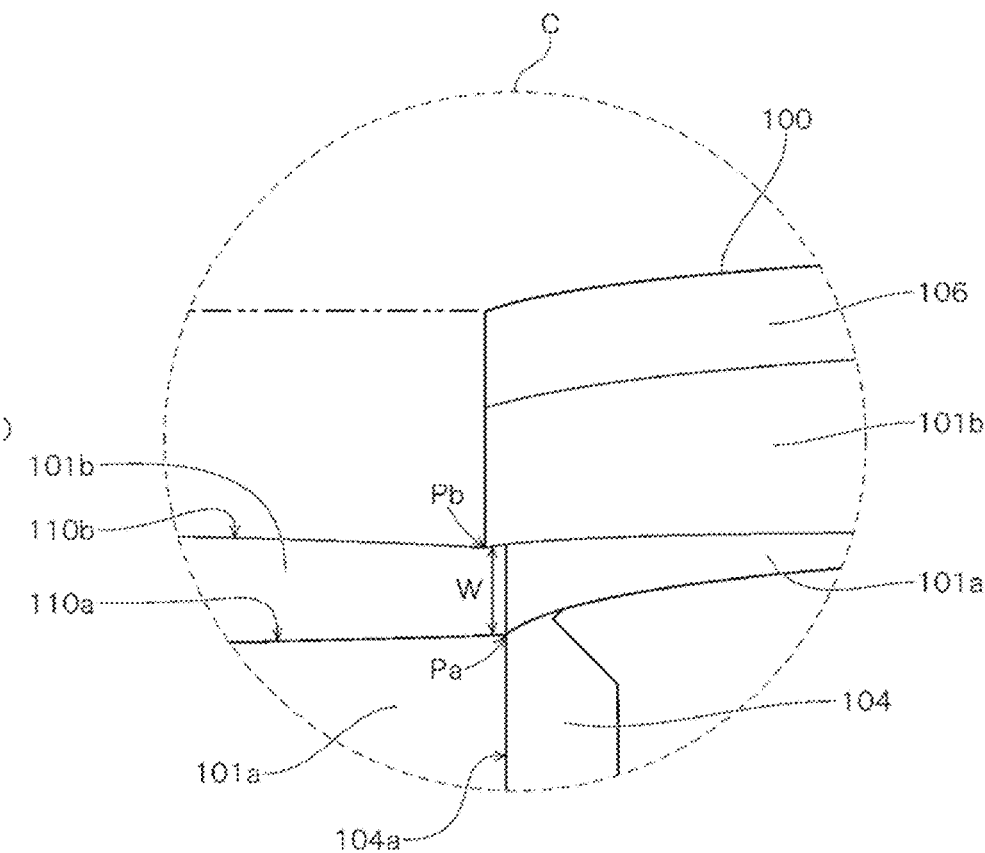
FIG. 7(B) is an enlarged view showing a part surrounded by a broken line C in FIG. 7(A).
Figure 8:
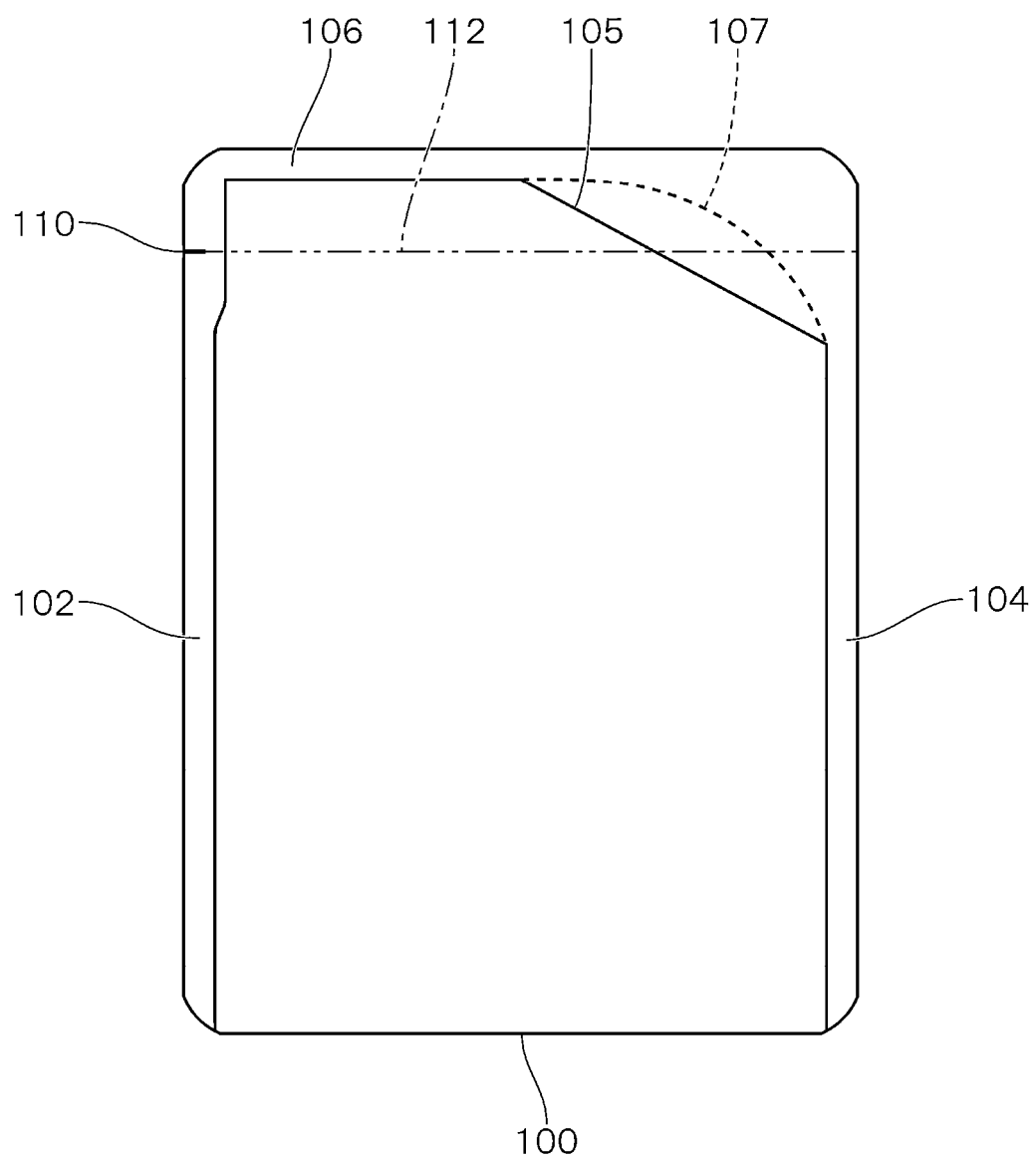
FIG. 8 is a front view showing a packaging bag according to a conventional example.

If the strong-pressure seal zone 7 is damaged along its outer edge 7b, as shown in FIG. 5, when the packaging bag 1 with the strong-pressure seal zone 7 is unsealed, sometimes the break line having been guided from the point A1 along the inner edge 50 of the strong-pressure seal zone 7 straddles the strong-pressure seal zone 7 midway at a point B and proceeds along the outer edge 7b of the strong-pressure seal zone 7. In this case, though the break line 10b is guided by the strong-pressure seal zone 7, the break shape in the strong-pressure seal zone 7 becomes irregular and this is not preferable for the appearance. For this reason, it is desirable that the break line is guided more certainly along the inner edge 50 of the strong-pressure seal zone 7.

Then, FIG. 3(d) shows the sectional shape of the seal bar 93 further improved for forming the strong-pressure seal zone 7 in the strong-pressure sealing step, and the sectional view of the inclination seal part 5 where the strong-pressure seal zone 7 is formed.

The seal bar 93 shown in the drawing is a pressing member with a pressing surface for pressing the strong-pressure seal zone 7, wherein the pressing surface includes a flat part 93a for pressing a part adjacent to the inner edge 50 of the strong-pressure seal zone 7, and an inclination part 93b that is provided consecutively to the flat part 93a and recedes from the flat part 93a as the distance from the flat part 93a increases.

As shown in the same drawing, the seal bar 93 is configured in such a manner that, in a cross-section orthogonal to an extending direction of the pressing surface, the inclination part 93b has a sectional shape of a part (for example, ¼ round) of a whole circumference of an ellipse, and a short axis of the ellipse is orthogonal to the flat part 93a at a boundary between the flat part 93a and the inclination part 93b of the sectional shape. By achieving the sectional shape in which the short axis of the ellipse is orthogonal to the flat part 93a, the part of the inclination part 93b adjacent to the flat part 93a can be gradually inclined.

Figure 4A:
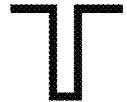
FIGS. 4(a) to 4(c) show pressing members where the pressing surface of the seal bar is composed of a flat part only.
Figure 4B:
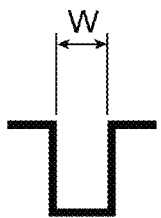
Figure 4C:
Figure 4D:
FIGS. 4(d) to 4(f) show pressing members where the pressing surface of the seal bar is composed of a flat part and an elliptical shape.
Figure 4E:
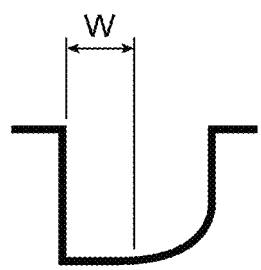
Figure 4F:

As shown in FIGS. 4(d) to 4(f), a width W in the sectional shape of the flat pressing surface of the seal bar forming the strong-pressure seal zone 7 can be experimentally set to a suitable value. For example, the width of 0.6 mm to 10.0 mm is preferable and, more preferably, the width is 1.0 mm to 5.0 mm. When the width W of the flat part of the pressing surface is 0.6 mm, the strong-pressure seal zone can be formed. However, as the width W of the flat part of the pressing surface is too narrow, this width is not preferable from the viewpoint of the strength of the seal bar. Further, when the width W of the flat part of the pressing surface is equal to or larger than 10.0 mm, it is difficult for the thickness of the strong-pressure seal zone 7 to become small and it is difficult to achieve sufficient pressing. Accordingly, improvement would be required to increase the pressing force of a device.

Further, the ellipse in the sectional shape of the pressing surface of the inclination part 93b has, for example, a radius of a long axis of 4 mm and a radius of a short axis of 3 mm.

When the packaging bag 1 is pressed by the seal bar 93, first, the packaging bag 1 is pressed by only the flat part 93a of the pressing surface. Next, as the seal bar 93 sinks into the packaging bag 1, the inclination part 93b gradually contacts with the packaging bag 1 from the side of the flat part 93a. As a result, the sealant pushed out to the outer edge side from the strong-pressure seal zone 7 is further gradually pushed outward as the inclination part 93b sinks.

Due to this, as shown in FIG. 3(d), at the outer edge 7b of the strong-pressure seal zone 7, the thickness of the packaging bag 1 continuously shifts without level differences from the strong-pressure seal zone 7 to the part adjacent to the outer edge 7b of the strong-pressure seal zone 7 of the inclination seal part 5. Therefore, the level difference along the outer edge of the strong-pressure seal zone 7 is more restrained, so that the appearance can be further improved.

Further, as shown in FIG. 3(d), the flat part 93a and inclination part 93b of the pressing surface of the heat seal head 93 are smoothly and consecutively provided via the boundary line 93c, and the boundary line is not squarish. Due to this, during the strong-pressure sealing step, it is unlikely that the front surface of the front film is damaged by the boundary line 93c along the outer edge 7b of the strong-pressure seal zone 7. This suppresses the state where, at the time of unsealing the packaging bag 1, the break line is guided along the outer edge 7b of the strong-pressure seal zone 7 and the break shape in the strong-pressure seal zone 7 is irregular as shown in FIG. 5.

In the above-described embodiment, the example where the strong-pressure seal zone 7 is formed by heat sealing in the strong-pressure sealing step has been explained; however, the strong-pressure sealing step is not limited to heat sealing.

For example, it is also possible that, during the strong-pressure sealing step, in a state where a temperature of the heat-sealed inclination seal part 5 is higher than a load deflecting temperature of the sealant resin, the higher pressing force than those in the other parts of the inclination seal part 5 may be applied by a pressing member to form the strong-pressure seal zone 7. In this case, the pressing member may be a seal bar (force plunger), which has the same sectional shape of the pressing surface as in the above embodiment and is not heated in itself. The pressing member may also press the inclination seal part 5 as a cooling member after heat-sealing the inclination seal part 5.

Further, in the strong-pressure sealing step, a part pressing the edge of the inner edge 50 of the strong-pressure seal zone 7 in the pressing member for forming the strong-pressure seal zone 7 may be chamfered or may not be chamfered.

Although the embodiments of the present invention have been described above, the present invention is not limited to the above-described embodiments, and various modifications can be made within the scope of the present invention. In the above-described embodiment, the packaging bag as the flat pouch having the substantially rectangular flat shape and having the four sides heat-sealed is explained. Meanwhile, in the present invention, the shape of the packaging bag is not limited to this case and can be applied to, for example, a standing pouch, a pouch with a gadget and a packaging bag having three sides of a folded-back film sealed.

The present invention can also be applied to a pillow packaging bag.

The outer edge of the packaging bag may also be symmetric or asymmetric to a symmetric axis line 11. The outer edges on both sides of the packaging bag may also be disposed parallel or non-parallel to each other. For example, if the outer edges on both sides of the packaging bag are non-parallel to each other and the planar shape of the packaging bag is a trapezoid, a center line of the trapezoid is the vertically extending symmetric axis line 11.

The unsealing virtual straight line 12 is generally orthogonal to the symmetric axis line 11.

Further, in the above-described respective embodiments, the example of extending the straight section of the inner edge of the inclination seal part in the tangential direction of an endpoint of the curve section has been explained. Meanwhile, the straight section may be connected to the endpoint of the curve section so as to be bent relative to the curved section.

The inner edge of the inclination seal part may also be configured as a straight line only, as a curve only, or as the curve part and the curve part disposed alternately.

INDUSTRIAL APPLICABILITY

The packaging bag according to the present invention can be applied to not only a packaging bag containing foods, but also various packaging bags containing beverages or medicines.

All the documents described in this specification and the contents of the Japanese application specification which is the basis of the priority of Paris of the present application are incorporated herein by reference.

DESCRIPTION OF REFERENTIAL NUMERALS

1 Packaging bag
1*a* Front film
1*b* Back film
10 Easily openable part
11 Symmetric axis line
12 Unsealing virtual straight line
10*a* Break line of the front film (front break line)
10*b* Break line of the back film (back break line)
10*c* Break line of an unsealing terminating end side seal part
2 Unsealing starting end side seal part (seal part of a first side)
3 Storage part
4 Unsealing terminating end side seal part (seal part of a second side)
5 Inclination seal part
50 Inner edge
51, 53, 55 Curve section
52, 54, 56 Straight section
6 Top seal part
6*a* Lower edge of the top seal part
7 Strong-pressure seal zone
7*b* Outer edge of the strong-pressure seal zone
80 Inner edge side protruding strip part
81 Outer edge side protruding strip part
90, 91, 92, 93 Seal bar
92*a*, 93*a* Flat part
92*b* Inclination part of the straight shape
92*c*, 93*c* Boundary line
93*b* Inclination part of an elliptic shape

The invention claimed is:

1. A packaging bag unsealed from a first side to a second side opposed to the first side, comprising:
    an inclination seal part at a corner provided consecutively to the second side, wherein
    the inclination seal part has a strong-pressure seal zone along an inner edge of the inclination seal part, the strong-pressure seal zone being pressed by a higher pressing force than other parts of the inclination seal part, and being smaller in thickness than other parts of the inclination seal part,
    the packaging bag includes, along the inner edge of the strong-pressure seal zone, an inner edge side protruding strip part in which a sealant resin pushed by pressing out from the strong-pressure seal zone accumulates, and
    at an outer edge of the strong-pressure seal zone, the thickness of the packaging bag continuously shifts without level differences from the strong-pressure seal zone to a part adjacent to the outer edge of the strong-pressure seal zone of the inclination seal part.

2. The packaging bag according to claim 1, wherein
    the packaging bag is a pouch configured such that the first side and the second side are respectively sealed,
    an easily openable part is formed in the first side, and the pouch is unsealed from the easily openable part to the second side through a storage part, and wherein
    an inner edge of the inclination seal part diagonally crosses an unsealing virtual straight line extending in an unsealing direction from the easily openable part.

\* \* \* \* \*